United States Patent [19]

Noonan

[11] Patent Number: 5,764,925
[45] Date of Patent: Jun. 9, 1998

[54] MULTIPLE LONG BUS ARCHITECTURE HAVING A NON-TERMINAL TERMINATION ARRANGEMENT

[75] Inventor: Bob L. Noonan, Cypress, Tex.

[73] Assignee: Compaq Computer Corporation, Houston, Tex.

[21] Appl. No.: 671,349

[22] Filed: Jun. 27, 1996

[51] Int. Cl.[6] ............................................. H03K 17/00
[52] U.S. Cl. .................. 395/281; 395/306; 395/308; 326/30; 307/98
[58] Field of Search ........................ 395/281, 306, 395/308; 326/30; 333/124; 361/58; 307/98

[56] References Cited

U.S. PATENT DOCUMENTS

| | | | |
|---|---|---|---|
| 5,028,820 | 7/1991 | Sullivan | 307/455 |
| 5,120,998 | 6/1992 | Seelbach et al. | 307/443 |
| 5,347,177 | 9/1994 | Lipp | 307/443 |
| 5,355,391 | 10/1994 | Horowitz et al. | 375/36 |
| 5,466,975 | 11/1995 | Wratten | 307/100 |
| 5,469,554 | 11/1995 | Tucker et al. | 395/420 |
| 5,473,264 | 12/1995 | Mader et al. | 326/30 |
| 5,479,123 | 12/1995 | Gist et al. | 327/108 |
| 5,507,002 | 4/1996 | Heil | 395/828 |
| 5,673,399 | 9/1997 | Gutherie et al. | 395/308 |

OTHER PUBLICATIONS

Article: "What is PCI (Peripheral Component Interconnect)"; Internet; May 27, 1996; pp. 1-8.
Article: "Peripheral Component Interconnect (PCI)", Internet; May 27, 1996; pp. 1-8.
Article: "PCI Frequently Asked Questions List"; Internet; Aug. 2, 1996; pp. 1-7.
Article: "Computer Design"; PennWell Publishing Company, 1992; Aug., 1992; pp. 42-45.

Primary Examiner—Jack B. Harvey
Assistant Examiner—Jeffrey K. Seto
Attorney, Agent, or Firm—Jenkens & Gilchrist, P.C.

[57] ABSTRACT

A computer system having an interconnection apparatus for connecting processors, peripherals and memories, the system including a plurality of electronic devices, and a multiple long bus structure with impedance elements disposed thereon for providing non-terminal termination points.

12 Claims, 5 Drawing Sheets

5,764,925

MULTIPLE LONG BUS ARCHITECTURE HAVING A NON-TERMINAL TERMINATION ARRANGEMENT

BACKGROUND OF THE INVENTION

1. Technical Field of the Invention

The present invention relates generally to computer systems and, in particular, to a bus system adapted for use in a computer system having a modularized system architecture.

2. Description of Related Art

Improved system performance is a much sought-after goal of paramount significance that has been vigorously pursued in the field of computer systems since its very beginnings. Two avenues have been particularly fruitful: modularization of functional subsystems and superior bus design. Both avenues have resulted in improved system performance. In personal computers, especially, modularization has resulted in a standardized motherboard having a processor unit, on-board memory, and a host of expansion slots into which are plugged various expansion cards providing such enhanced functionality as telecommunications, disk storage and improved video.

While modularization of stand-alone computers has resulted in standard features such as those described above, the fast-growing field of network computer systems has engendered a new level of modularization altogether. It has become increasingly clear to many computer designers that having a single motherboard with a system bus thereon in a computer that is networked in a server-client relationship with other computers (known as "clients") places severe design and performance constraints on that computer (known as a "server"). Many designers of server architectures have thus adopted a design philosophy of modularizing the motherboard itself into component system boards, all of which may be plugged into system board slots provided preferably on a backplane board having interconnect circuitry. Hence, it is envisioned in such a paradigm to have a backplane board with system board slots for, for example, a processor board containing at least a processor unit, various memory modules and possibly a few expansion slots for added functionality; and at least a port board containing a host of input/output ports.

On the other hand, the goal of achieving ever-increasing performance criteria for computer systems has also mandated advanced bus design techniques. As is well-known in the art, system buses provide a communications pathway in computer systems that carries information including address information, control information, and data in accordance with a bus protocol. One problem that is common with system buses is that as the performance of a processor increases, that is, as the processing speed increases, it is necessary to provide a concomitant increase in bus transfer rate. That is, it is necessary to permit more address information, control information, and data to be transferred at faster rates on the bus so as not to nullify the advantages obtained by the use of a superior processor.

Signal propagation in a communications pathway physically occurs along an electrically conductive element, for example, a wire trace, and, as is known in the art, depends upon the frequency and length of the conductor. As operating speeds of the computer systems increase, propagation of signals between the processor and memory or peripheral devices over the communication pathway must be increasingly well controlled. For example, at relatively slow system clock and bus data rates, signal propagation characteristics remain relatively independent of the conductor length, and the signal waveform is adequately predicted and described by DC circuit analysis. At low frequencies, signals are fully absorbed (that is, non-reflected) at media discontinuities and terminal ends of the conductor, and do not affect other functional subsystems coupled to the conductor, that is, the bus.

However, as the signal frequency increases, for example, greater than around 30 MHz or so, transmission characteristics of a bus (for example, minimum cycle time, which in turn determines the maximum bus transfer rate) are no longer independent of the conductor geometry, especially the length. Two inter-related electrical parameters are of particular importance: propagation delay and settling time. The total delay associated with driving the bus includes the propagation delay through a bus driver and the period of time necessary to have the bus settle. As is known in the art, bus settling time is related, among other parameters, to the time necessary to have reflections on the bus die out before data is received by receivers on the bus.

As data rates on the system bus increases, it has therefore become necessary to minimize reflections on the bus. This is so because reflections of transmitted high frequency signals at conductor discontinuities and conductor terminations can create superimposed signals, and thereby increase the total delay and further cause unexpected results.

To preclude instances of reflected signals causing data transmission errors in high frequency data communication pathways, line terminators have been developed to match the impedance of the transmission line and thus provide a nonreflecting, that is, absorbing, termination to the transmission line. In this approach, precisely matched line terminators are coupled to terminal ends of transmission lines (that is, bus conductors) so that to the signal the lines appear to be infinite in length, causing the signal to be absorbed fully at the terminal end. Thus, by providing terminators at terminal ends of a bus interconnecting one or more subsystems, reflections on the bus are minimized or precluded altogether, thereby ensuring reliable operation of functional subsystems coupled to the bus.

Several problems are encountered in the foregoing approach to terminating the bus. One problem is that the approach does not specifically address the length-limitation of signal transmission characteristics of a high-performance bus. For example, a recently introduced high-performance system bus, known as the Peripheral Component Interconnect ("PCI") bus, that operates at least at times at 33 MHz, may not be more than about 10 inches in length. As can be appreciated, such a constraint restricts a system designer's choice as to how many devices can be loaded onto the PCI bus. It is well-known in the art that the current PCI bus architectures cannot support more than about 8–10 devices.

A second possible problem is that termination at the end of the bus requires the selection of a precisely matched impedance element although the in-line component devices may vary their impedance over time. Further, termination of a bus at the ends of the bus still leaves portions of the bus between common bus conductors and individual devices on the bus unterminated. These portions can become a source of reflections on the bus as the bus frequency increases.

Another practical concern is that a system user must physically attach or detach a line terminator (hereinafter, a "terminal terminator"), to the segments of the bus depending upon certain signal transmission conditions, which conditions are often not easily ascertained by the user. For example, if no disk drive is connected at the terminal end of a Small Computer System Interface ("SCSI") bus segment, a line terminator should be attached to prevent undesirable reflections from the unterminated bus end.

More recently, switching terminators have been developed which electrically connect or disconnect a terminator circuit element from the signal pathway, without requiring physical intervention by the user. An example of such a switching terminator is the model MCCS142235, manufactured by Motorola, Inc., of Schaumberg, Ill. However, a user must still make a determination whether to engage the terminal terminator in the first instance, and then activate or deactivate the switching terminator accordingly. Further, although software interfaces could be written to enable the switching terminal terminator as necessary, the additional layer of code required on the system processor is cumbersome and would be processor-dependent.

As will be described in the following detailed description, the present invention overcomes the aforementioned problems associated with current bus designs by providing a high performance bus architecture that is geometry-independent (that is, the bus well exceeds current length specifications without compromising performance) and that has a nonterminal termination arrangement. It can be readily appreciated by those skilled in the art upon reference hereto that although a presently preferred exemplary embodiment of the present invention that is described hereinbelow involves the use of the PCI bus disposed in a server system environment, practice of the present invention is not restricted to the use of the PCI bus only, and that the present invention, whose novel features are described and claimed hereinbelow, encompasses in its scope the use of any bus standard, for example, the Industry Standard Architecture ("ISA") bus; the Extended Industry Standard Architecture ("EISA") bus; the MicroChannel™ Architecture ("MCA") bus or, the VL-Bus. In addition, it should be further understood that the present invention is implementable in any motherboard configuration, modularized or otherwise, disposed in any computer system.

SUMMARY OF THE INVENTION

The present invention overcomes the aforementioned problems associated with current bus designs by advantageously providing a high performance bus architecture that is geometry-independent (that is, the bus well exceeds current length specifications without compromising performance) and that includes a nonterminal termination arrangement.

In one aspect, the present invention includes an interconnection apparatus for connecting processors, peripherals and memories, comprising a plurality of electronic devices; a bus structure having a plurality of electrically conductive signal transmission lines disposed among the plurality of electronic devices for communicating electrical signals therebetween; and a plurality of impedance elements nonterminally disposed on the bus structure for providing nonterminal termination points so that signal reflections on the bus structure are nullified.

In a yet another aspect, the present invention is directed to a computer system wherein a plurality of the electronic devices is disposed on a plurality of system boards that may be removably coupled to a backplane board; and the bus structure is further divided into a first bus and a second bus, with a bus-to-bus bridge disposed therebetween for facilitating electrical transmission of communication signals between the first bus and the second bus.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
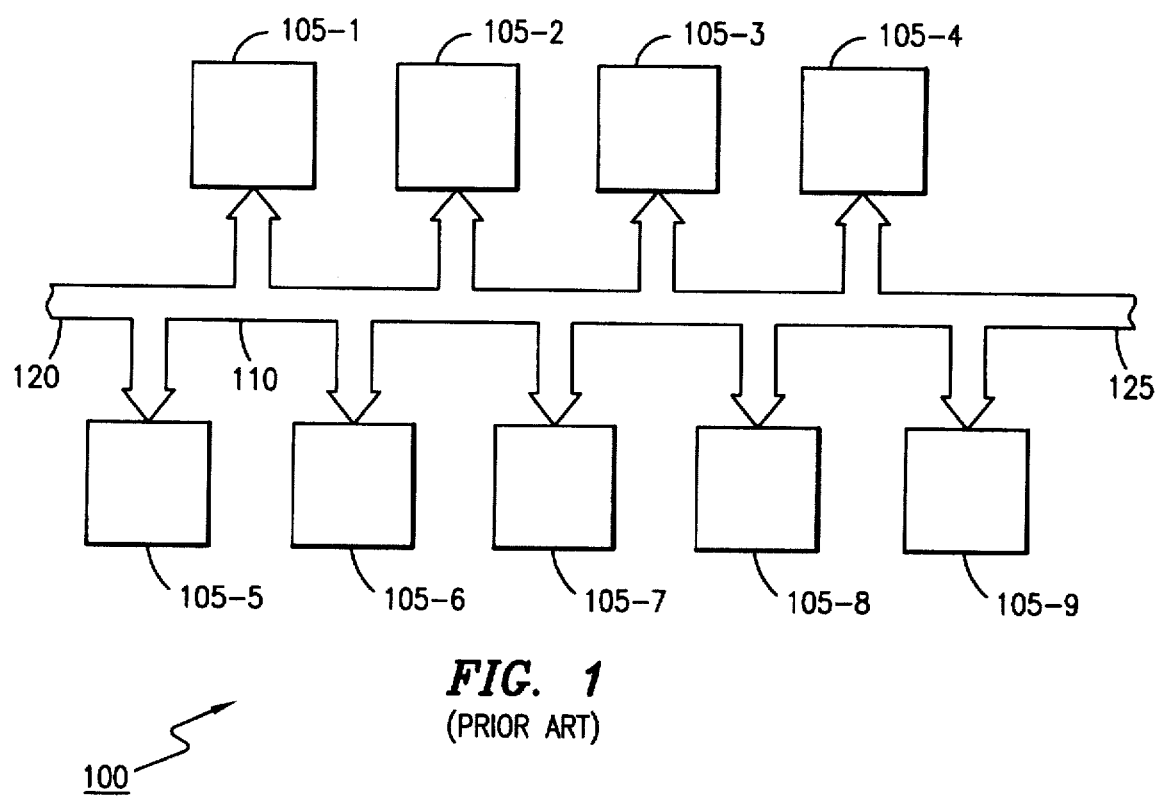
FIG. 1 is a block diagram depicting a prior art arrangement of an exemplary PCI bus.

Referring now to the drawings wherein like or similar elements are designated with identical reference numerals throughout the several views, and wherein the various elements depicted are not necessarily drawn to scale, and in particular to FIG. 1, there is shown a block diagram, generally designated with reference numeral 100, of a conventional arrangement of an exemplary conventional PCI bus 110. In one aspect, the PCI bus 110 is a 32-bit bus running at up to 33 MHZ clock rate, having a 132M/s burst capacity. In an alternative aspect, the PCI bus 110 may be a 64-bit bus running at a clock rate of 66 MHZ, achieving a higher peak bandwidth of 264M/s.

In either aspect, the PCI bus 110 is disposed among a plurality of electronic devices, of which nine devices (105-1 to 105-9) are shown in FIG. 1, for providing an electrical path for communication signals therebetween. The electronic devices 105-1 to 105-9 may comprise both master devices such as microprocessors and peripheral controllers, as well as slave devices, for example, memory components or bus transceivers. Since the data and address lines (not shown in FIG. 1) are typically multiplexed to reduce pin count, the slave devices may have 45 pins (not shown) while the master devices may have 47 pins (not shown).

Continuing to refer to FIG. 1, it can be seen that the PCI bus 110 is a non-terminated bus, that is, there are no terminating elements attached at the either end, 120 or 125, of the bus structure. Conventionally, this is so because the PCI bus 110 is a reflective bus such that signals asserted by a sending device do not attain their full amplitude until the reflection thereof from the discontinuity of the bus occurs. Furthermore, conventionally, the processor-independent PCI bus structure is about only ten inches in length, and can support less than about 10 electronic devices.

Figure 2:
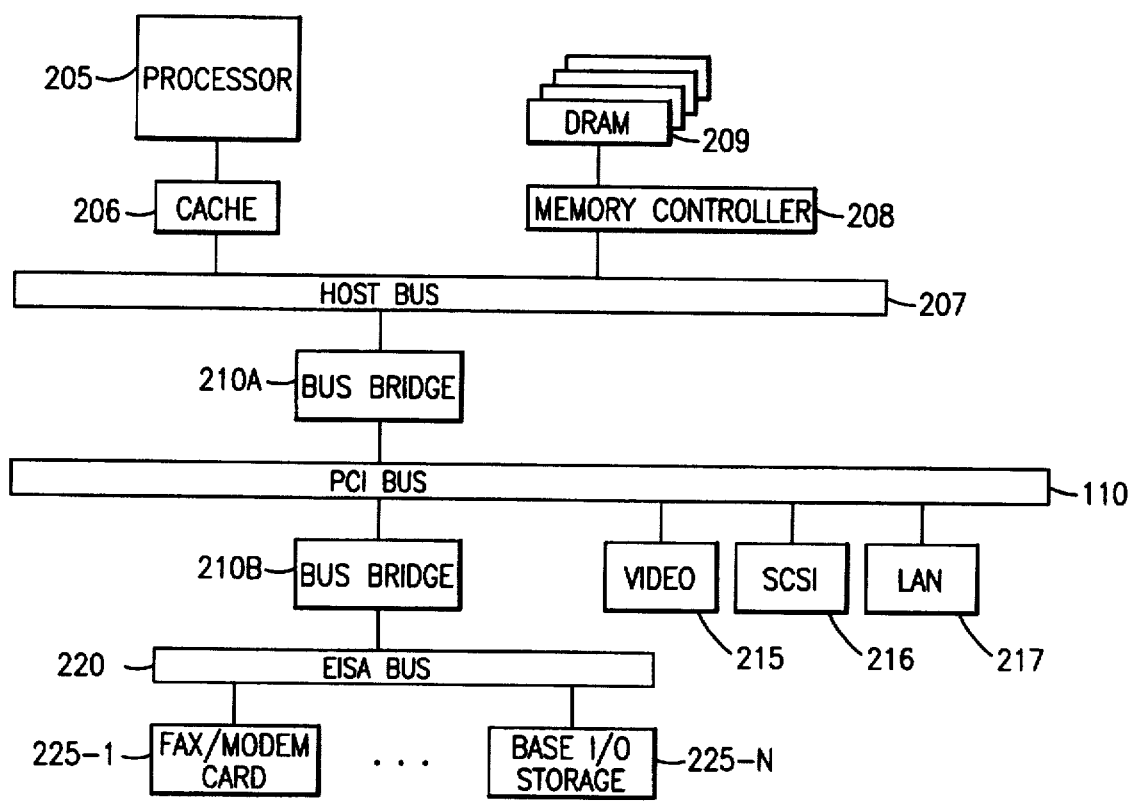
FIG. 2 is a block diagram depicting an exemplary prior art desktop system having the conventional exemplary PCI bus arrangement.

Referring now to FIG. 2, therein is depicted a block diagram, generally designated with reference numeral 200, of an exemplary prior art desktop system having the conventional PCI bus arrangement. A processor 205 is in electrical communication with a cache memory block 206. A host bus 207 electrically interfaces with the cache memory block 206 and a memory controller 208, which memory controller 208 is used for managing data flow to and from a volatile random access memory block 209.

Continuing to refer to FIG. 2, the host bus 207 is also electrically connected to the PCI bus 110 through a bus-to-bus bridge block 210A. The PCI bus 110, in this exemplary desktop configuration, is connected to three peripheral devices, a video block 215, a Small Computer System Interface ("SCSI") controller 216, and a Local Area Network ("LAN") device 217. Further, the PCI bus 110 is also bridged to an Extended Industry Standard Architecture ("EISA") bus 220, via another bus-to-bus bridge block 210B. The EISA bus 220, in turn, is electrically connected to a plurality of input/output cards, of which a FAX/modem card 225-1 and a mass storage card 225-N are shown.

Figure 3:
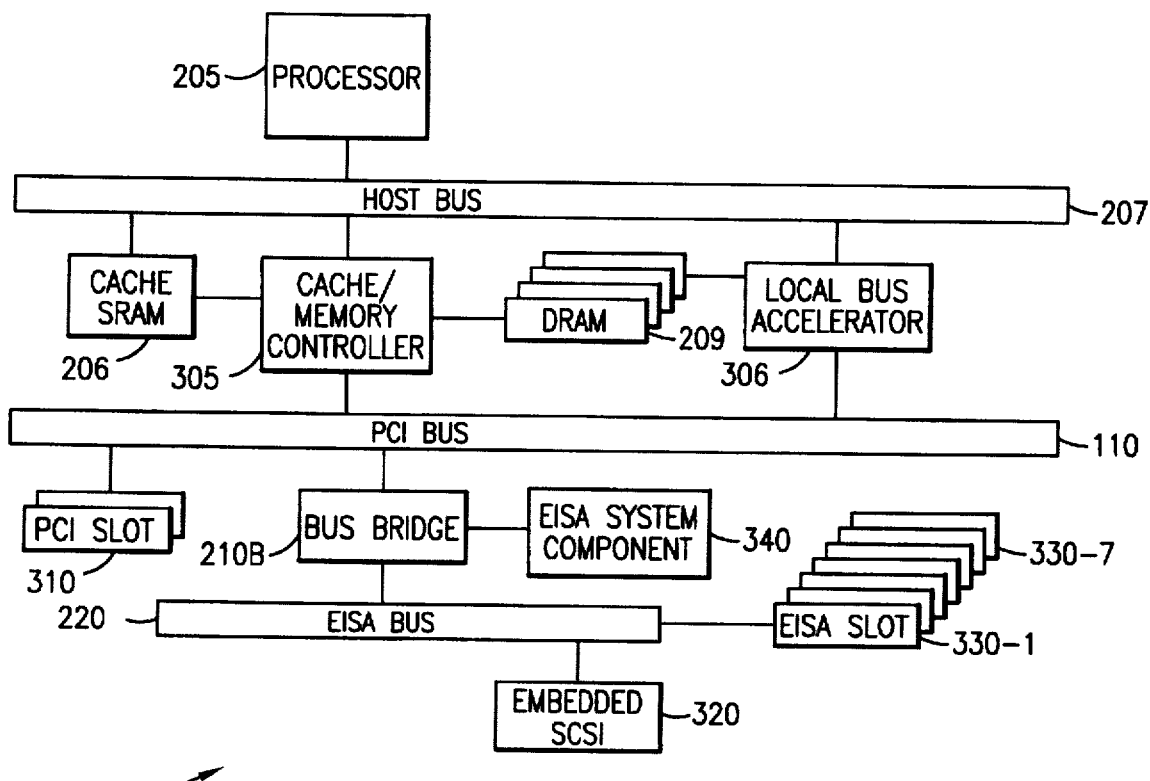
FIG. 3 is a block diagram depicting an exemplary prior art server system having the conventional exemplary PCI bus arrangement.

Referring now to FIG. 3, therein is depicted a block diagram, generally designated with reference numeral 300, of an exemplary prior art server system having the conventional PCI bus arrangement. The processor 205 is connected via the host bus 207 to the cache block 206, a cache/memory controller 305 and a local bus accelerator 306. The cache/memory controller 305 controls the data flow to and from the cache block 206 and the volatile random access memory block 209. Further, the cache/memory controller 305 is electrically connected to the PCI bus 110.

Continuing to refer to FIG. 3, it can be seen that the PCI bus 110 is connected to a PCI expansion slot block 310 for subsequent coupling with PCI devices (not shown). In addition, the PCI bus 110 is bridged via the bus bridge 210B to the EISA bus 220 and to an EISA system component 340. The EISA bus 220 is interfaced to an embedded SCSI device 320 and a plurality of expansion slots, 330-1 to 330-7.

Taking FIGS. 1, 2 and 3 together, it is useful to summarize the current design characteristics of the PCI bus 110. As discussed hereinabove, the conventional PCI bus 110 is arranged, in either the desktop system, generally designated by reference numeral 200 in FIG. 2, or the server system, generally designated by reference numeral 300 in FIG. 3, to be a non-terminated bus. As is well-known in the art, the PCI bus 110 is processor-independent, that is, the PCI bus 110 can be implemented on systems with both x86 and non-x86 architectures, for example, PowerPC, Alpha AXP and MIPS architectures. However, as mentioned above, the conventional PCI bus 110 is typically implemented to be a bus having a length less than 10 inches, supporting less than 10 devices or so. Moreover, the PCI bus 110 is conventionally disposed on a single motherboard in either the exemplary desktop system 200 or the exemplary server system 300.

Figure 4A:
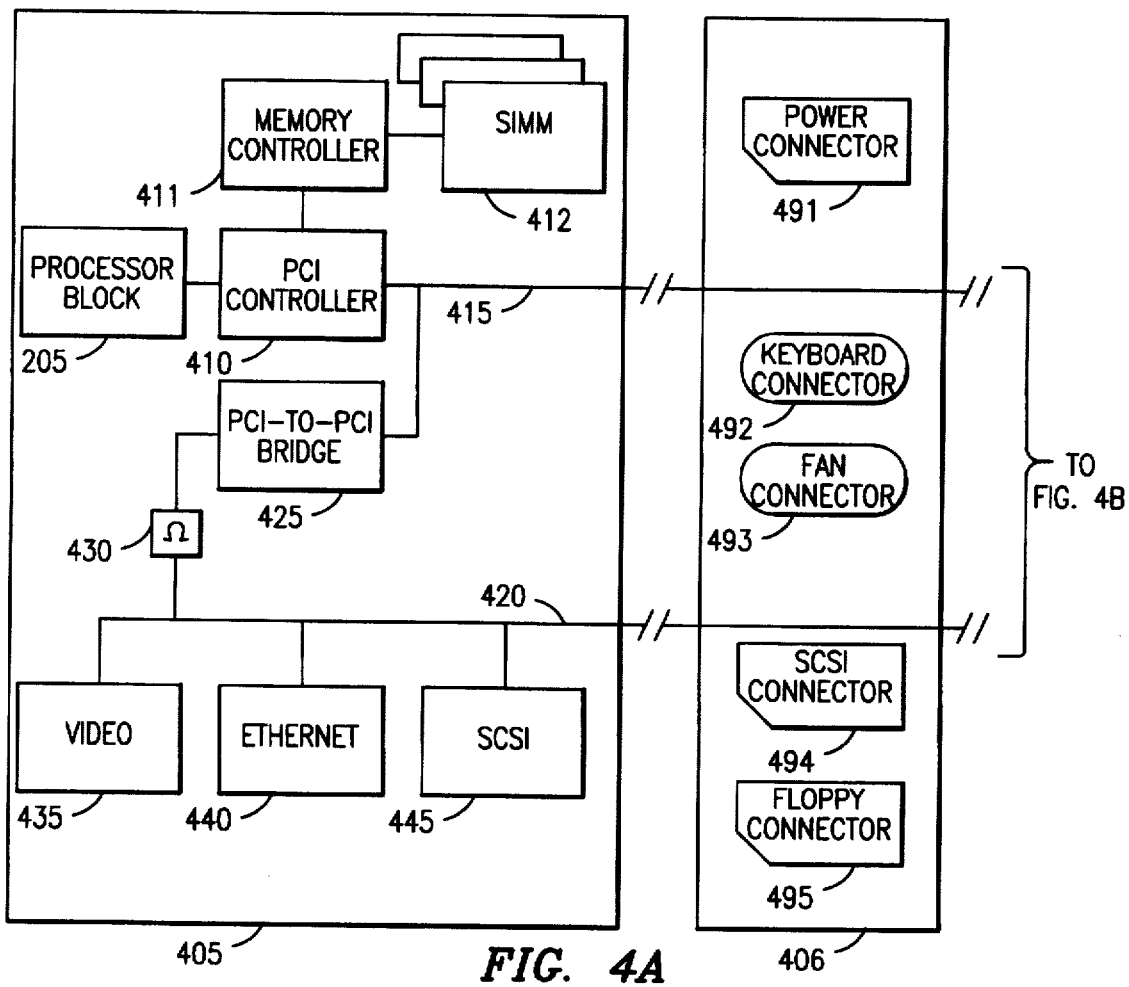
FIGS. 4A and 4B depict a block diagram of a presently preferred embodiment of the present invention in an exemplary computer system.
Figure 4B:
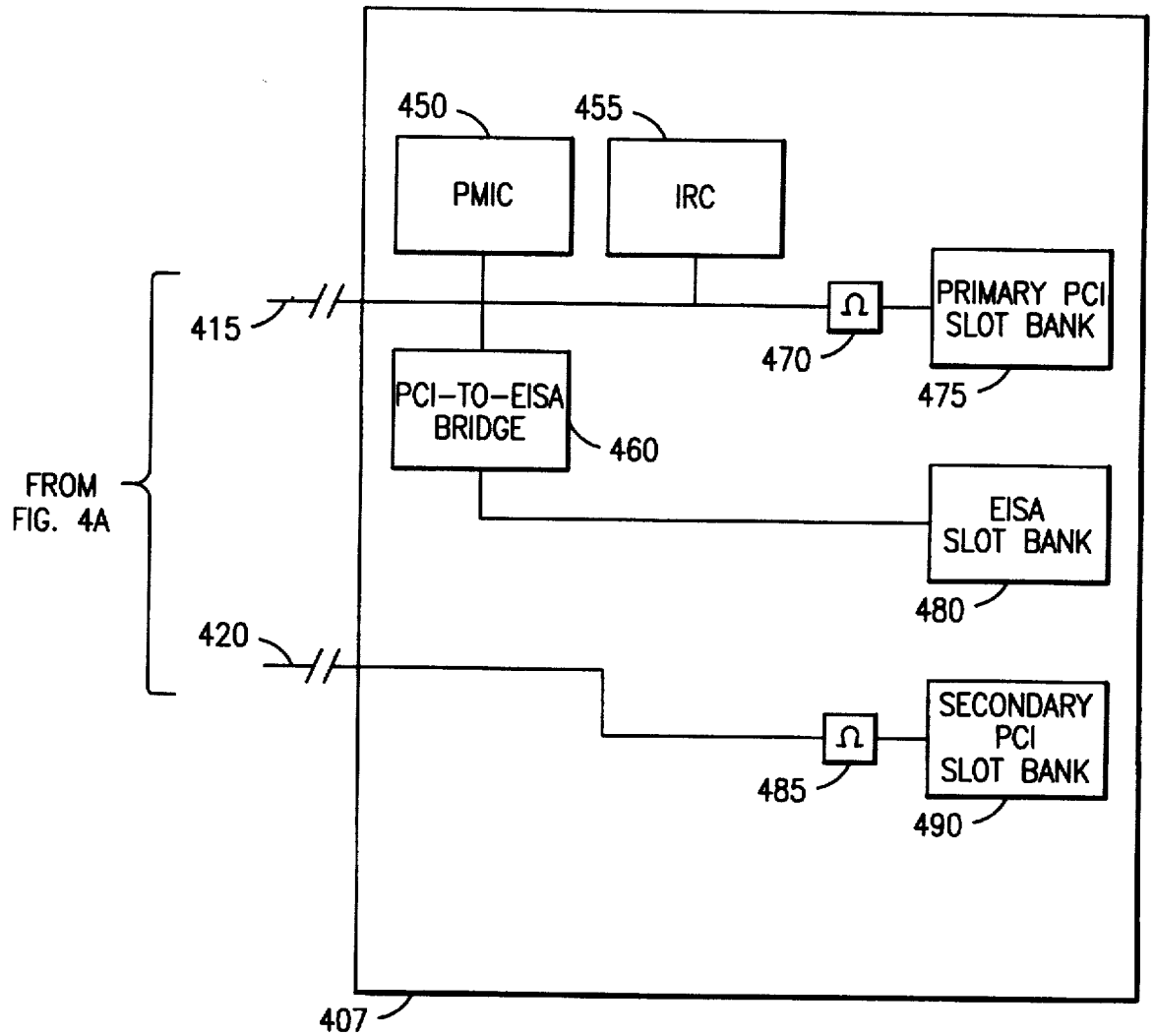

Referring now to FIGS. 4A and 4B together, there is shown a block diagram of a presently preferred embodiment of the present invention in an exemplary computer system having a first system board 405, and a second system board 407, coupled to a backplane board 406. In addition to providing system board sockets (not shown) for removably coupling the system boards 405, 407, the exemplary backplane board 406 preferably provides a power connector 491, a keyboard connector 492, a fan connector 493, a SCSI connector 494 and a floppy drive connector 495.

Continuing to refer to FIGS. 4A and 4B, the processor block 205 is connected to a PCI controller 410 which in turn is connected to a memory controller 411. The memory controller 411 controls the data flow to and from a memory module block 412. The PCI controller 410 is interfaced with a primary PCI bus 415 that extends across the first system board 405 and onto the second system board 407 via the backplane board 406. A PCI-to-PCI bridge 425 is used for bridging the primary PCI bus 415 to a secondary PCI bus 420 via a first impedance element block 430 that is serially disposed therebetween. According to the teachings of the present invention, the serially-disposed impedance element block 430 provides a non-terminal termination point for the exemplary embodiment of the PCI bus structure having the primary PCI bus 415 and the secondary PCI bus 420. It can be appreciated by those skilled in the art upon reference hereto that the ohmic value of the first impedance element block 430 may be selected based upon the actual implementation of the PCI bus structure with specific loads.

Still continuing to refer to FIGS. 4A and 4B, the secondary PCI bus 420 is interfaced with a video device 435, an Ethernet/LAN device 440 and a SCSI device 445. In the presently preferred exemplary embodiment of the present invention, the video device 435, the Ethernet/LAN device 440 and the SCSI device 445 are disposed on the first system board 405. In addition, the secondary PCI bus 420 extends from the first system board 405 to the second system board 407 via the backplane board 406.

Referring now specifically to FIG. 4B, the primary PCI bus 415 is extended on the second system board 407 to be connected to a PCI Multiprocess Interface Chip ("PMIC") load and an Integrated Remote Console ("IRC") load. In accordance with the present invention, the PMIC load is a slave device and the IRC load is a master device. The primary PCI bus 415 is further extended to a primary PCI slot bank 475 via a second impedance element block 470 serially disposed therebetween for providing an additional non-terminal termination point. As with the first impedance element block 430, the ohmic value of the second impedance element block 470 may be selected based upon the actual implementation of the PCI bus structure with specific loads.

Still specifically referring to FIG. 4B, the primary PCI bus 415 is bridged via a PCI-to-EISA bridge 460 to an EISA expansion slot bank 480. The secondary PCI bus 420 which is extended from the first system board 407 (shown in FIG. 4A) via the backplane board 406 (shown in FIG. 4A) is connected to a secondary PCI slot bank 490 via a third impedance element block 485, serially disposed therebetween for providing a nonterminal termination point. Again, it can be readily appreciated that the ohmic value of the third impedance element block 485 is implementation-specific.

Based on the foregoing, those skilled in the art should understand and appreciate that the present invention provides a computer system that includes a high performance interconnection apparatus having a composite bus structure that precludes signal reflections by providing multiple non-terminal termination points through a plurality of serially disposed impedance elements. Furthermore, the bus structure is geometry-independent, in that it is not limited by length of the conductive transmission lines, as favorable results have been obtained by using multiple bus lengths of up to 26 inches or so.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. For example, instead of configuring the system board arrangement as having a two system boards removably coupled to a backplane board, it is possible to have multiple system boards wherein some are removably and the rest are fixedly coupled to one or many "backplane" boards. Similarly, it is envisioned herein that the PCI bus structure may be decomposed into multiple strands instead of a first bus and a second bus, depending upon the actual implementational objectives, all or a subset thereof having non-terminal terminating points disposed serially thereon. Furthermore, as has ready been emphasized, the present invention encompasses in its scope the use any bus standard, for example, the ISA bus; the EISA bus; the MCA bus or, the VL-Bus. In addition, it should be further understood that the present invention is implementable in any motherboard configuration, modularized or otherwise, disposed in any computer system.

What is claimed is:

1. A computer system including an interconnection apparatus for connecting processors, peripherals and memories, comprising:

a plurality of electronic devices;

a bus structure comprising a plurality of electrically conductive signal transmission lines disposed among said plurality of electronic devices for communicating electrical signals therebetween; and a plurality of impedance elements nonterminally disposed directly on said bus structure.

2. The computer system as set forth in claim 1, wherein said plurality of electronic devices comprises:

a subplurality of master devices; and a subplurality of slave devices.

3. The computer system as set forth in claim 1, wherein said plurality of electronic devices is disposed on a plurality of system boards.

4. The computer system as set forth in claim 1, wherein said plurality of electronic devices comprises a first group of electronic devices, said first group being disposed on a first system board, a second group of electronic devices, said second group being disposed on a second system board, and further wherein said first system board and said second board are removably coupled to a backplane board.

5. The computer system as set forth in claim 1, wherein said bus structure comprises a first bus and a second bus, said first bus and said second bus being electrically coupled together via a bus-to-bus bridge disposed therebetween.

6. The computer system as set forth in claim 5, wherein said plurality of impedance elements comprises a first subgroup of impedance elements, said first subgroup being disposed on said first bus, a second subgroup of impedance elements and a third subgroup of impedance elements, said second and said third subgroup of impedance elements being disposed on said second bus.

7. A computer system, comprising:

a first bus having a first plurality of electrically conductive signal transmission lines, each of said first plurality of electrically conductive signal transmission lines having a first ohmic element, said first ohmic element being non-terminally disposed thereon;

a second bus having a second plurality of electrically conductive signal transmission lines, each of said second plurality of electrically conductive signal transmission lines having a second ohmic element and a third ohmic element, said second ohmic element and said third ohmic element being non-terminally disposed thereon; and a bridge, said bridge being disposed between said first bus and said second bus, said bridge for facilitating electrical communication between said first bus and said second bus.

8. The computer system as set forth in claim 7, wherein each of said first ohmic element, said second ohmic element and said third ohmic element comprises a resistor.

9. The computer system as set forth in claim 7, wherein said first bus is a peripheral component interconnect bus.

10. The computer system as set forth in claim 7, wherein said second bus is a peripheral component interconnect bus.

11. The computer system as set forth in claim 9, wherein said first bus is at least 10 inches long.

12. The computer system as set forth in claim 10, wherein said second bus is at least 10 inches long.

* * * * *